United States Patent [19]
Seeger et al.

[11] Patent Number: 4,905,222
[45] Date of Patent: Feb. 27, 1990

[54] CIRCUIT ARRANGEMENT FOR CENTRALLY CONTROLLED TIME DIVISION MULTIPLEX TELECOMMUNICATION SWITCHING SYSTEMS, PARTICULARLY PCM-TELEPHONE SWITCHING SYSTEMS WITH LINE TRUNK GROUPS CONNECTED TO A SWITCHING MATRIX

[75] Inventors: Helmut Seeger, Wolfratshausen; Axel Leichum; Anthony Maher, both of Munich, all of Fed. Rep. of Germany

[73] Assignee: Siemens Aktiengesellschaft, Berlin and Munich, Fed. Rep. of Germany

[21] Appl. No.: 197,534

[22] Filed: May 23, 1988

[30] Foreign Application Priority Data

May 22, 1987 [DE] Fed. Rep. of Germany ....... 3717269

[51] Int. Cl.$^4$ ............................................. H04Q 11/04
[52] U.S. Cl. ...................................... 370/58.1; 370/16
[58] Field of Search ............................. 370/16, 63, 58; 340/825.79, 875.8; 329/248

[56] References Cited

U.S. PATENT DOCUMENTS

| 4,499,461 | 2/1985 | Schneider | 340/825.03 |
| 4,654,841 | 3/1987 | Ekberg | 370/16 |
| 4,700,348 | 10/1987 | Ise et al. | 370/16 |
| 4,763,316 | 8/1988 | Schaich et al. | 370/58 |

FOREIGN PATENT DOCUMENTS 0058750 7/1985 European Pat. Off.

OTHER PUBLICATIONS

"Telcom Report" vol. 4 (1981), supplement Digital Exchange System EWSD (in German).

Primary Examiner—Robert L. Griffin
Assistant Examiner—Wellington Chin
Attorney, Agent, or Firm—Adel A. Ahmed

[57] ABSTRACT

Line trunk groups coupled to a double central switching matrix by way of two PCM lines and including sub-switching matrix and group control units are allocated to one another in pairs. Prepared for stand-by service switch-over by the central switching matrix and the processor are subscriber and trunk lines within each line trunk group pair, which are connected to the sub-switching matrix of a first line trunk group and are switchable to that of a second line trunk group, such that their group control unit also assumes the control functions. The processor going into service with the stand-by switch-over is connected with the group control units of all first line trunk groups via its central switching matrix, while all switching service continues with those of all second line trunk groups. Connection data of all existing connections are stored in all group control units. Each of the first group control units requests these data from the corresponding second group control units which are thereupon transmitted and stored, and thereafter retrieved by the processor going into stand-by service and employed for the establishment of corresponding connections via the central switching matrix and first sub-switching matrices, whereupon subscriber and trunk lines within each line trunk group are switched over from the first sub-switching matrix to the second sub-switching matrix without interruption of connections.

9 Claims, 2 Drawing Sheets

FIG 1

CIRCUIT ARRANGEMENT FOR CENTRALLY CONTROLLED TIME DIVISION MULTIPLEX TELECOMMUNICATION SWITCHING SYSTEMS, PARTICULARLY PCM-TELEPHONE SWITCHING SYSTEMS WITH LINE TRUNK GROUPS CONNECTED TO A SWITCHING MATRIX

A circuit arrangement for centrally controlled telecommunication switching systems, particularly PCM-telephone switching systems is already known in the art through the Journal "telecom report" Supplement 1981, particularly Pages 7ff., 19ff and 49ff, in which a central switching matrix serving for communication interconnection together with a program controlled central processor serving, among other functions, for the control of the latter, as well as for the necessary switch identifier processing, being provided in duplicate for alternate stand-by service, and wherein a number of local line trunk groups, each with a sub-switching matrix for the connection of external trunk and/or subscriber lines are equipped with a local programmable control unit for the reception of switch identifiers from these lines, for switch identifier pre-processing and forwarding to the central processor and for the transmission of switch identifiers on these lines, and in which in each of these line trunk groups the respective sub-switching matrix is internally connected via two separate groups of link lines with switching matrix terminations to respective ones of the two parallel switching matrices provided and wherein data connections with respect to respective local control units are brought into service condition and/or maintained therein for data exchange between the local control units on the one hand and the respective service ready and/or service prepared processor on the other, serving for the above switch identifier processing as well as the transmission of program and switching software, for which purpose an input-output unit connected with the central processor is provided, which, like the link lines, is directly connected with a plurality of link terminations provided per data connection, like the link lines with switching matrix terminations.

The sub-switching matrices of the peripheral line trunk groups are shown and described (GS) on Page 19ff, among others, of the above noted Journal. Internally, they are connected with the doubled central switching matrix ("switching network") and externally via the coupling unit (LTU/DTU) with analog lines and/or channels from digital transmission systems. These lines and/or channels (insofar as they are not subscriber lines and/or channels provided for subscriber connections) lead to other switching centers and are individually allocatable for the establishment of connections in a known manner. The control channels held in a continuously interconnected state via the doubled switching matrix are described on Page 8. The central switching matrix and the central processor are thus doubled for reasons of security. This doubling is not of particular importance when viewed in terms of the whole of such a switching center, since it affects only a few central components. The peripheral line trunk groups and their associated components, such as for example, the local control unit and sub-switching matrix which are present in greater number, and consequently are spread over a relatively wide area, are therefore not doubled. During the failure of a line trunk group (for example its sub-switching matrix or its local control unit or its power supply), only such a relatively small part of the total number of the connected subscriber lines and trunk lines are affected thereby that a temporary interruption which is limited to these is acceptable. In the case of the control channels mentioned in the noted Journal, the data connections noted in the preamble are considered which must be available to serve for the data exchange required for the processing of incoming data over the line trunk groups by the central processor, as well as for the transmission of program and switching software from the central processor to the local control units, and which are thus developed between the local control units on the one hand and the central processor on the other, and which are brought into the service ready state and/or permanently held therein.

The generally well known principle of the stand-by circuit is realized in switching systems of the kind noted in the preamble. An equivalent circuit means is required when continuing switching service is being executed by one of the two parallel central switching matrices and one of the two central processors, i.e. the central processor allocated to the appertaining central switching matrix, must be continued instead by the respective other central switching matrix and the respective other central processor.

Such stand-by switching provisions are especially necessary when disturbances are present or on the occurrence of faults and are thus mostly unforseeable. Faults and disturbances may be so serious that an immediate substitute switching circuit is necessary. Often however, such faults and disturbances affect only part of the total switching system, for example, only a part of the central switching matrix or only specific functions of the same or in the central processor, or they occur sporadically. In such cases, that is, in most stand-by service cases that become necessary, the stand-by service means may be delayed for a short period of time.

It has already been proposed, in relation to a circuit arrangement of the type indicated in the preamble in connection with stand-by service means to which two line trunk groups are respectively allocated in pairs, wherein in each of these there are line circuits, for example subscriber line circuits, multiple subscriber line circuits, trunk (-multiple) termination circuits and the like serving for the connection of external subscriber and/or trunk lines within their respective line trunk group and connected to their respective sub-switching matrix during normal service and may be partially switched over during emergency service, whereby the line circuits of a respective first of these two line trunk circuits, upon the need for emergency service, are additionally switched to the respective other sub-switching matrix, that is, a respective second line trunk circuit, and whereby the connections through the switched-over line circuits, the corresponding switch identifier processing as well as the setting of the sub-switching matrix is also executed by the other, that is, a second line trunk circuit, and that a stand-by switch-over of one of the two central processors is prepared by the other of the two central processors while service continues, that not only all paired line trunk circuits allocated to each other are transferred from normal to emergency service, but that the other central processor brings all data connections to the local control units of all first line trunk groups into service-ready state via its allocated central switching matrix as well, and in continuous sequence transmits the program and switching software that is required for their start-up to the local control units for storage therein. A switching circuit developed in this manner makes it possible, under continued switching operation with reduced traffic capacity relative to the capacity of the switching center function, to substantially reduce the duration of full service interruption affected by the central processor and central switching matrix in connection with a stand-by switch-over. The reduced traffic capacity therefore occurs only during a transition period.

The invention relates to a similar circuit arrangement and, more particularly to a circuit arrangement for centrally controlled telecommunication switching systems, in particular to PCM - time division multiplex telephone switching systems in which a central switching matrix serving interconnections as well as a central processor serving, among other functions, for its control, as well as for the necessary processing of switch identifiers, is provided in duplicate for stand-by service capability and in which a number of trunk line groups, each with a sub-switching matrix for the connection of external trunk and/or subscriber lines and each with a local control unit are equipped for the reception of switch identifiers from these lines for switch identifier pre-processing as well as for switch identifier forwarding to the central processor and for the transmission of switch identifiers over these lines and in which in each of these trunk line groups the respective sub-switching matrix is internally connected via two groups of link lines with switching matrix terminations to the one and to the other of the two parallel provided central switching matrices and in which data connections for the exchange of data, serving for the above switch identifier processing between local control units on the one hand, and the respective service-ready processor on the other, respectively, for each local control unit, for which the local control units are brought into service ready state and/or held therein, via its allocated switching matrix and in which the trunk line groups are allocated to each other in pairs and within each of which line units, e.g. subscriber line circuits, multiple subscriber line circuits, trunk- (multiple) termination circuits and the like serving for the connection to external subscriber and/or trunk lines, are connected primarily with their sub-switching matrix, are commutatable in a manner by means of which the line circuits of a respective first of these two line trunk circuits are additionally switched to the sub-switching matrix of the respective other, that is, a respective second line trunk group, whereupon the connections for the corresponding switch identifier processing as well as setting of the sub-switching matrix interconnected via the switched over line units are also executed by the local control unit of the other, that is, a second line trunk circuit.

In a circuit arrangement of this type there is the problem, in connection with the switch-over procedure described, that in switching systems of the prior art, the existing connections are interrupted. They must therefore be re-established by the subscriber which is not only troublesome and requiring effort under some circumstances, for example because the originally selected subscriber number must be looked up again, but the subscribers are subject to an additional charge especially in the case of local calls, because the original connections have been lost and new connections must be established. In addition, the problem arises that the re-establishment of the connection interrupted in connection with the switching procedure places transient above-average demands principally on those elements such as the central processor and the local control units which are heavily loaded with data processing procedures.

An object of the invention is to indicate means for a circuit arrangement of the latter discussed type with the aid of which existing connections need not be interrupted and newly established, during the mentioned switch-over procedure.

The invention solves the problem posed in that, through the switch-over one of the alternate circuits within each pair of line trunk groups, allocated to each other, one of the central processors together with its allocated switching matrix is prepared through the other of the two processors, again with the central switching matrix allocated thereto, during continuing service of the first, with the aid of, first, data connections which are brought into service-ready state by the other central processor via its allocated central switching matrix to the local control units of all first line trunk groups; and, second, of connection data which indicate, via the central switching matrix still in service and via the sub-switching matrix of the respective individual connections within the second line trunk circuit, which external sub-switching matrix is connected with which of its like, or which two external sub-switching matrices are connected with their like and which are stored in the local control units of the respective second line trunk groups and which, on the basis of a request signal from the local control unit of the respective first line trunk group to the respective second line trunk group, are transmitted per line trunk group pair, via local transmission paths of the line trunk pairs respectively from the last named control unit to the first named control unit and stored there, and which in addition are retrieved from each of these through the other central processor and; third, of connections, which the latter establishes in conjunction with these through the retrieved connection data via its central switching matrix and the sub-switching matrices of the respective first line trunk groups and; that the switch-over of all line trunk groups from the sub-switching matrices of all first line trunk groups to those of all second line trunk groups occurs independently of the execution of the latter procedure for the establishment of connections.

The drawings of FIG. 1 and FIG. 2 illustrate an embodiment of the invention showing only those components essentially contributing to its understanding but in no way limited to the same.

Before the description enters into the essential characteristic features of the embodiment, the operating mode of a modern telephone switching center in which the invention is applied will be explained. The starting point of the description will be the time division multiplex telephone switching system with PCM technology known in the art as it is described extensively and in detail in the technical literature, for example in the Journal "telecom report" mentioned further above. On Page 19ff therein are described peripheral line trunk groups which are a part of such a telephone switching system. As is likewise shown in FIG. 1 on Page 8 of this noted periodical, switching matrix (SN) and central processor (CP) are provided in duplicate, designated by "K1" and "K2" and by "ZW1" and "ZW2" in FIG. 1.

Figure 1:
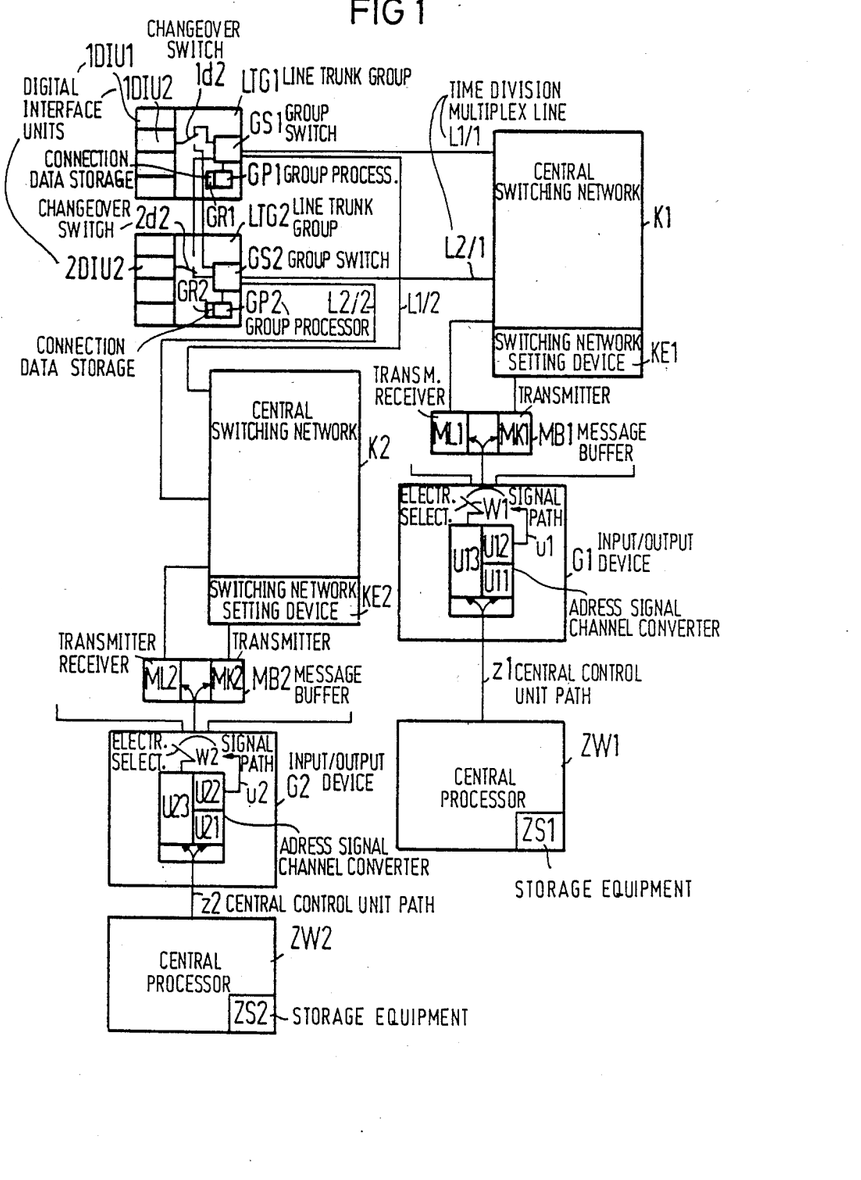
FIG. 1 shows in essence a telephone system of the type described in German Pat. No. 3 128 365 (VPA 81 P 6257).

The drawing shows two line trunk groups LTG1 and LTG2 that are a part of a centrally controlled time division multiplex telephone switching system based on PCM technology according to FIG. 1. They are connected to the central and doubled switching matrix K1/K2 having time division multiplex inputs and time division multiplex outputs via time division multiplex lines L1/1, L2/1, and L1/2 and L2/2 according to FIG. 1 in a self evident manner. Thereby each of these connections corresponding to this doubling of the switching matrix is a duplicate of the other. Each of those two provided time division multiplex lines per line trunk circuit, for example, LTG1, has a large number, thirty for example, of channels for each of the two transmission directions and is accordingly connected with each time division multiplex input as well as with each time division multiplex output of these two switching matrices, — as is shown in detail and described in the above-noted Patent.

Furthermore as is shown in FIG. 1, a central processor ZW1 and/or ZW2 is provided for each of the paralleled switching matrices K1/K2 with the aid of which the entire control activities for the establishment of connections via the respective central switching matrix K1 and/or K2 are accomplished in a manner known in the art through a buffer unit MB1/MK1 and/or MB2/MK2 and a switching matrix setting unit KE1 and/or KE2 as is separately described in the noted Patent. For this purpose data is retrieved from the line trunk groups, e.g. from the line trunk groups LTG1 and others, via the central processor ZW1 and/or ZW2, as well directed to these in the opposite direction. At the same time local control units GP1, GP2 and similar others in the line trunk circuits cooperate in a manner known in the art. The line trunk circuits and their integral line units are address selected for this data exchange.

Of the two central switching matrices K1 and K2 and the two central processors, a switching matrix, for example K1, and a central processor, for example ZW1, are respectively in service while the other switching matrix and the other processor are available in the event of a stand-by switch-over, if the need arises. Provisionally, in the interest of simplifying the further general description, discussion will be limited to the central switching matrix K1 and the central processor ZW1 only.

The data to be transmitted from the central processor ZW1 to the line trunk groups noted, which may also be retrieval instructions for the retrieval of data to be transmitted from the line trunk circuits and/or the line circuits to the central control unit, for example dialing data, is respectively prefixed with an appertaining line unit designated address. If but one line unit is to be selected from the central processor ZW1 for the transmission of data (retrieval instruction, if required) from the same to the former, it next transmits the address and the data in sequence to an input-output unit G1, (in "telecom report" : IOP). This unit then receives both and stores them.

As explained in the previously noted Patent, data connections exist via one channel per time division multiplex line between the input-output unit G1 on the one hand and each of the trunk line circuits and their local control units, for example GP1, GP2, on the other, via the time division multiplex lines L1/1 and/or L2/1 as well as via the switching matrix K1 and by way of buffer units MB1/ML1. If now, the input-output unit has received data long with an address from the central control unit ZW1 via the path zl, it directs a first element of the address to an address signal channel converter U1/U2.

This first address element of the address corresponds to the respective line trunk circuit and therewith to its allocated data connection via buffer unit MB1 and switching matrix K1. Converter U11/U12 provides control data corresponding to the first part of the address which it sends to an electronic selector W1 which is set thereby to the appertaining signal channel (via the buffer MB1). The input-output unit G1 is thereby connected via the same to the local control unit, for example GP1, of the appertaining line trunk group, for example LTG1, and now transmits to the same the complete address, i.e. including the first address element.

A large number of line trunk groups serving as termination of time division multiplex trunk circuits allocated to different traffic directions are provided, of which the two line trunk groups LTG1 and LTG2 are shown in essence. Significant tasks and functions of these line trunk groups are described in great detail in the noted Journal and are assumed understood for the case at hand.

As is brought out further in the Journal noted, each of the line trunk groups respectively includes a number of line units. These serve in a manner known in the art for the termination of subscriber circuits, trunk circuits or transmission systems with individually allocatable connecting channels. There are different types of line units, for example those for analog subscriber circuits, others for digital subscriber circuits, others for analog trunk circuits and the like. Likewise, there are line units which serve for the connection of a time division multiplex trunk circuit, which as is known can encompass a large number, for example twenty or thirty, of individually allocatable PCM—channels. Involved here, strictly speaking, is one channel pair per connection, such that one channel respectively is provided for one transmission direction and the other for the other transmission direction.

In the Journal noted, the purpose which the indicated line units serve is described in detail. In the case of analog subscriber circuits and/or analog trunk circuits a line unit is provided for a number of circuits. Line units for time division multiplex operated transmission systems that respectively encompass a larger number of channel pairs (see above) are so constructed that a transmission system with twenty-four or thirty channel pairs is connected. In the Journal noted there is further disclosed that in a line trunk circuit, which is arranged for time division multiplex transmission systems, a total of four or five of such line units are provided. The Journal noted further indicates that within a single line trunk circuit, line units connected to a time division multiplex switching unit of the appertaining line trunk circuit are connectable via the same with channels of the corresponding time division multiplex input of the appertaining line trunk circuit and the corresponding time division multiplex output of the central switching matrix.

Figure 2:
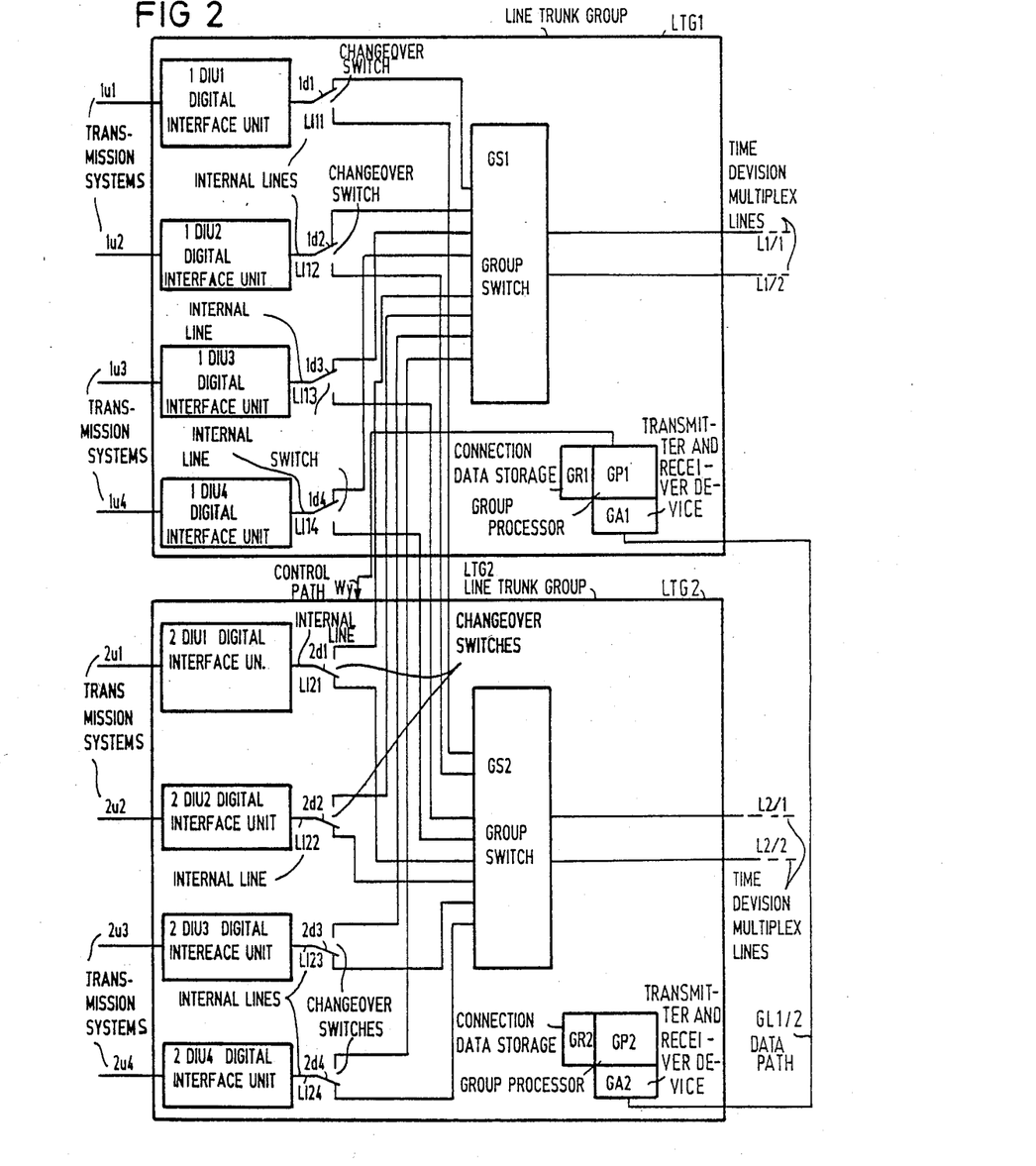
FIG. 2 shows additional details of the invention.

One factor among others, in the case of this numerical allocation, is the concern that the traffic loads on the various sub-interfaces of the circuit paths be as well matched as possible. In practical terms, this means that the number of channel pairs which include all line units of time division multiplex trunk circuits (PCM transmission systems, to which each may be allocated a different traffic direction, but which may also be allocated in two's or more, respectively in common to one and the same traffic direction) is about equal to the number of channel pairs which that time division multiplex circuit encompasses which connects the appertaining line trunk circuit with the central switching matrix. Thus, the transmission systems 1u1 through 1u4 in FIG. 2 may have about the same number of channel pairs as the time division multiple L1/1.

Since it may happen that the local control devices GS or time division multiplex lines may be subject to failure which thus also applies to the time division multiplex lines L1/1, L1/2, L2/1 and L2/2, this would have the consequence that the time division multiplex transmission systems that are respectively connected to the appertaining line trunk circuit would likewise no longer be available for the establishment of a connection. Since switching technology systems using the above values and data related to the number of channel pairs per traffic direction frequently need to provide only a single transmission system per transmission direction, the appertaining transmission system per traffic direction would also fail during the failure of a local control device, a sub-switching matrix or a time division multiplex line connected with a central switching matrix and line trunk group. The same applies to a failure of the local control device, for example GP1 of a line trunk group, for example LTG1.

Such a possible disadvantage is ruled out by a means in which two line trunk groups are associated as pairs. What then applies to the two line trunk groups LTG1 and LTG2 shown excerpted in the drawing also applies for all other line trunk groups with peripheral devices to which PCM time division multiplexers are connected in the manner indicated. Furthermore, provision is made so that, during emergency service the peripheral devices 1DIU1 through 1DIU4 and 2DIU1 through 2DIU4 of each of these two line trunk groups LTG1 and LTG2 which are connected to the time division multiplex switching unit Gs1 and/or Gs2 of their own line trunk group LTG1 and/or LTG2, one of the two line trunk groups, for example LTG2, may be switched to a time division multiplex unit forming a sub-switching matrix, for example GS1, of the respective other line trunk group, for example LTG1. Change-over switches 1d1 through 1d4 and 2d1 through 2d4 are provided for this purpose. These are shown in the state corresponding to normal service in the drawing. Upon a change from normal service to emergency service, they are switched from the state shown into their operating state. The emergency service situation exists when a related failure condition of the kind noted above appears in a line trunk group.

If now the change-over switches 2d1 through 2d4 are changed from the state shown in the drawing into the operating state during the change from the normal service condition to the emergency service condition, the line units 2DIU1 through 2DIU4 of the line trunk group LTG2 are connected with the time division multiplex switching device GS1 of the line trunk group LTG1 from this time forward. As a result the PCM transmission systems 2u1 through 2u4, with their individually allocatable channels, can continue to be operated during a failure of the time division multiplex line L2. Each of these PCM transmission systems may be individually allocated its own traffic direction. It is also possible to allocate two or more PCM transmission systems to a traffic direction, i.e. they may, in view of the switching system technology, form a common bundle of channel pairs.

As was noted further above, the connections are established via the central switching matrix K1. The central processor ZW1 participates in this action. The line trunk groups, the respective line units they contain, as well as channel pairs carried via these, are selectable in the central processor with the aid of addresses. Provision may now be made for each of the line units to be selected from the central processor with the aid of a normal service address as well as with the aid of an emergency service address. These normal service addresses and emergency service addresses are thus employable according to the respective operational need. Provision is thus made so that the line units which are wired with PCM transmission systems are selectable from the central processor by means respectively of a normal service address and respectively an emergency service address, and that upon the appearance of an operating failure in a line trunk group, for example LTG2 and/or its group control device, for example GP2, which in normal service operation of the same unblocks the emergency service addresses of the appertaining line units, 2DIU1 through 2DIU4 blocked in the central processor and blocks the normal service addresses of these line units instead. In a manner not described in detail, the central processor is thus informed that a line trunk group, for example LTG2, is switching from normal service to emergency service. On the basis of this message the central processor originates the aforementioned procedure of unblocking the emergency service addresses of the appertaining line units as well as the blocking of the normal service addresses of these line units. This also holds in a similar way, for selection addresses of the channel pairs which are carried via the appertaining line units. In this connection, provision is also made for the line units, for example 2DIU1 through 2DIU4, to be directly selectable from the central processor by means of the normal service addresses via their allocated line trunk circuit, for example LTG2, by the emergency service address via the respective other line trunk group, for example LTG1.

In the same manner in which the previously described switch-over of the communication paths (all channel paths) occurs by means of the change-over switches 2d1 through 2d4, the central clock pulse supply of the appertaining line units is also switched to the respective other line trunk group upon switch-over from normal service to emergency service. Thus, assurance is thereby gained that the line units run time synchronously with the line trunk group to which the respective switch-over has occurred. In the same way the required operating voltages for the appertaining line units may be switched from that line trunk group that has switched over from normal service to emergency service, to the respective other line trunk group. An even greater advantage is gained if the operating voltage supply is designed to be redundant, i.e. fail safe, for example duplicated for all line units of the two line trunk groups.

Deviating in part from what has been described before, it is also possible to arrange for the line units to be selectable by the central processor via the signal channels allocated to the line trunk groups through an address encompassing a first address element designating the respective line trunk group and a second address element within the same, designating the respective line unit. This has already been touched upon. With the aid of the first address element of the address of the appertaining line unit, that line trunk group is respectively selected of which the line unit is a part. The selection of the line trunk group occurs in the manner indicated in that selection setting data is formed in the address signal converter U11/U12 in conjunction with the first address element which is sent to the electronic selector W1 via the control path u, whereby the input-output device G1 is connected via the buffer device MB1 with that signal channel that has been kept in the interconnected state via the switching matrix K1 which leads to the appertaining line trunk group via a time division multiplex line, for example L1/1. Thus an address signal converter G1 is provided in the central processor which, upon the presentation of data to a line unit provides a signal channel number from the processor based on the data supplied address in conjunction with its first address element, for the selection of the appertaining signal channel. This signal channel number thus designates the previously mentioned signal channel. This signal channel number serves as setting data, which is forwarded over the signal path ul to the noted electronic selector, for its setting to the appertaining signal channel. This electronic selector may also be developed in any preferred manner as a coupler. The address-signal channel converter G1, in the central processor ZW1, may obviously also be provided as an independent unit (as shown in FIG. 1) but may also be a component of the same. Otherwise it serves in a manner known in the art for the development of the input procedures and output procedures of the central processor ZW1.

As has been explained, in the respective selection of a signal channel for the purpose of selecting the appertaining line trunk group, the indicated address as well as the data is transmitted over this signal channel. Address and data are transmitted via the time division multiplex switching matrix unit mentioned, for example GS1, then to the appertaining local control unit, for example GP1. Through the address, and particularly through the second address element contained therein, the latter recognizes which of the line units the respective data is to be forwarded to.

In the previously described context it was pointed out that the address element already mentioned further above designates that line trunk group to which the address and data were transmitted in the manner described. The second address element now indicates which of the line units within the appertaining line trunk group, for example LTG1, is the one to which the appertaining data is to be forwarded. It is to be assumed, that this is the line unit 1DIU2. It is to be further assumed, that the appertaining line trunk group, for example LTG1, finds itself in the normal service state. In this case therefore the change-over switch 1d2 is the resting position shown in FIG. 1. It follows therefore that the line unit 1DIU2 is connected to the time division multiplex switching unit GS1 of the line trunk group LTG1 via the resting position of the change-over switch 1d2.

As previously mentioned, the local control unit GP1 has, along with the data, also received and stored in the buffer, the address comprising a first address element designating the line trunk group LTG1 and a second address element designating the line unit 1DIU2. Based on the first address element, the local control unit GP1 recognizes that the appertaining data is to be forwarded to a line unit belonging to the same line trunk group LTG1. Based on the second address element the local control unit GP1 recognizes that the data is to be forwarded to the line unit 1DIU2. On this basis the local control unit GP1 so controls the time division multiplex switching unit, that a transmission path interconnects the local control unit GP1 with the line unit 1DIU2 which thus leads by way of the resting position of the change-over switch 1d2.

Departing from what has been described previously, provision may also be made so that local control unit GP1, in the context indicated, does not also receive the data along with the appertaining address, but only the address itself, and that it establishes a direct transmission path for the data in conjunction with the same, from the signal channel leading over the time division multiplex line L1/1 via the time division multiplex unit GS1 and the resting position of the change-over switch 1d2. Thus in this case, the address is received in the local control unit GP1 via the signal channel and is employed for the establishment of a direct interconnection from the indicated signal channel to the appertaining line unit. Thus in this case the buffering of the appertaining information in the local control unit GP1 becomes unnecessary.

Still to be mentioned in this connection is the special emergency service situation. As has been previously mentioned, an emergency service situation due to a failure may be caused when the signal channel between a line trunk group and the central processor is unusable, or when the local control unit, for example GP2, and/or the time division multiplex switching unit, for example GS1, of the appertaining line trunk group does not exhibit the required functional capability. The central processor has the capability of recognizing this through the continuous execution of a monitoring procedure which is detailed in the referenced Journal "telecom report", as well as in German Pat. No. 3 106 903. Should the central processor perceive a service failure which involves the line trunk group, for example, LTG2, the entire data exchange between the central processor ZW1 and the line units 2DIU1 through 2DIU4 from the line trunk group LTG2 affected by the service failure continues via the line trunk group LTG1 for the duration of the service malfunction. To this end, all change-over switches in the respective line trunk group LTG2 are changed over from their rest position to their operating position. This may follow in two ways. Provision may be made so that the service failure within the line trunk group affected by it is itself recognized. This may come about in that the constant monitoring of the total functional capability of each data exchange by the central processor serving the line trunk groups, according to the last mentioned German Patent no longer occurs and that this is perceived within the respective line trunk group. On this basis the mentioned actuation of the change-over switches 2d1 through 2d4 within the appertaining line trunk group can itself be taken up through its local control unit, for example GP2. However it may also be arranged that central processor ZW1 identifies the respective service failure in the line trunk group LTG2 and that it transmits appropriate data regarding this to the local control unit GP1 of the paired line trunk group LTG1, and that this then transmits a command to the indicated four change-over switches in the line trunk group LTG2 for their actuation.

During the service malfunction affecting the line trunk group LTG2 the change-over switches 2d1 through 2d4 are thus actuated. Accordingly the line units 2DIU1 through 2DIU4 are connected with the time division multiplex switching unit GS1 of the line trunk group LTG1.

When the central processor ZW1 senses the functional disturbance affecting the respective line trunk group LTG2, it also senses that continuing data exchange with the appertaining line units 2DIU1 through 2DIU2 is to ensue by way of the signal channel of the line trunk group LTG1, so it also provides corresponding data to the address signal converter U11/U12, in the input-output G1. Through this data, the signal channel number related to the line units 2DIU1 through 2DIU4 in the line trunk group LTG2, is temporarily altered. In practical terms this means that for the duration of the service malfunction of the line trunk group LTG2, upon the selection of one of its line units, the address signal converter upon receiving an address having a first address element designating the line trunk group LTG2 sends control data over the control path ul to the electronic selector W1 to insure, in this case, that the signal channel of the line trunk group LTG1 rather than the signal channel of the line trunk group LTG2 is selected by the electronic switch W1. The central processor thus provides the address and the data for the selection of an appertaining line unit 2DIU1 through 2DIU2 in the service malfunction state of the line trunk group LTG2 in the same way as in the normal service state of LTG2. For the duration of the service malfunction in the line trunk group LTG2 the address signal channel converter U11/U12 determines that the signal channel of the line trunk group LTG1 is selected rather than its LTG2 signal channel. The re-routing of the data related to the service malfunction of LTG2 for its line units thus occurs in the input-output unit with the aid of the electronic selector W1 as a result of the temporary alteration of signal channel numbers stored in the address signal channel converter U11/u12, which are retrieved from it as control data in each case and forwarded for the control of the selector W1.

If data, together with its associated address, consisting of a first address element and a second address element is now sent to the line trunk group LTG1 as a result of a failure, although the appertaining data is intended for one of the line units 2DIU1 through 2DIU4, the local control unit GP1 senses through the first address element, that the appertaining data is intended for a line unit of the respective other line trunk group. By means of the second address element this local control unit identifies the respective line unit for which the data is intended. On the basis of the first address element and on the basis of the second address element the local control unit GP1 sends the respective data on to that line unit of the other line trunk group LTG2 for which it is intended. For this purpose the local control unit GP1 connects through a transmission path via the time division multiplex unit GS1 over which the data is then transmitted. This occurs via a corresponding connection of the time division multiplex switching unit GS1 and the actuation side of the appertaining change-over switch, for example 2d2. In this case too, the respective data may be stored in the buffer memory of the local control unit GP1 and then transmitted from there to the appertaining line unit, for example 2DIU2, or provision may be made in the manner described above, so that, in the case described here as well, a direct interconnecting path is formed from the signal channel leading through the time division multiplex line L1/1, through the change-over switch 2d2, in its actuated position, to the line unit 2DIU2.

Data may be transmitted in the manner described above, from the central processor to each of the line units as well as in the opposite direction. In the latter case data transmitted from the central processor to the appertaining line unit may be a request, on the basis of which the transmitted and requested information is sent from the appertaining line unit to the central processor. Data transmission from line unit to line unit may ensure in the same manner as is described in German Pat. No. 3 128 365. Data from a line unit of a line trunk group may thus be transmitted to a line unit of another line trunk group in this manner, whereby these data need not be received by the central processor ZW1 itself, but rather upon arrival in the input-output unit G1 from a line unit, it will be directly transmitted to the appertaining line unit for which it is intended. This is made possible through the forwarding of data within the input-output unit as described in the Patent document last noted.

As is brought out in the preceding part of the description, a central switching matrix K1/K2, serving for the interconnection switching is provided in duplicate. Likewise provided in duplicate is a central processor ZW1/ZW2, whereby the one switching matrix, for example K1 and the one central processor, for example ZW1 are allocated to each other, which also holds for the other switching matrix and the other central processor. Among other functions, the central processor serves in a manner known in the art, for the control of its switching matrix as well as for the processing of the switch identifiers required for the purpose. Each of the two processors is program controlled in a manner known in the art. The duplication of switching matrix and central processor serves in a known manner for the possibility of stand-by service. For the case of a functional disturbance and/or a switching system failure in one of the two switching matrices and/or in of the two central processors and/or in one of their respective further allocated elements, the known possibility exists, that the switching serve instead of continuing with the one central switching matrix, for example K1, and one of the two central processors, for example ZW1, will do so rather with the other of the two switching matrices, for example K2, and with the other of the two central processors, for example ZW2—and oppositely.

As has likewise already been explained—and as is also already known from the referenced section in the literature—a number of local line trunk groups are each equipped with a sub-switching matrix for the external connection of trunk and/or subscriber lines and corresponding channels, and with a local programmable control unit for the reception of switch identifiers from these lines, for switch identifier pre-processing and forwarding to the appertaining central processor and for the transmission of switch identifiers to the noted lines or channels. Thus for example, the line trunk group LTG1 exhibits the sub-switching matrix GS1 and the local control unit GP1. Connected externally to the sub-switching matrix GS1 are the units 1DIU1 through 1DIU4, which have already been mentioned further above. Internally the sub-switching matrix is connected to two time division multiplex lines L1/1 and L1/2, which lead to the two central switching matrices K1 and K2. Each of these time division multiplex lines encompasses a number, for example thirty, channel pairs, as has likewise been explained further above, whereby a respective channel pair contains a transmission channel in the one transmission direction and a transmission channel in the other transmission direction.

Each of these channel pairs form a link line. Consequently, each sub-switching matrix, for example GS1, is connected via two groups of link lines, separated in groups, with switching matrix terminations of the one and of the other of the two parallel switching matrices.

It has likewise already been mentioned—and may also be understood from the literature noted further above—that for data exchange, serving for the manipulation of switch identifiers, between the local control units on the one hand and the respective service-ready processor on the other, data connections are brought into service ready-state and/or maintained therein. In this switch identifer manipulation therefore, the dial information provided by subscribers as well as the switch identifiers arriving via the already established or partially established communication paths, which arrive over the local line trunk groups are directed to the respective central processor after a pre-processing by the respective local control unit, whereby the former processes setting data for its central switching matrix, as well as switch identifiers and control data, which are again directed to the respective local control unit via the appertaining connections and are transmitted from there, and/or for the connection of call progress tone signals, call signals and the like, for the appertaining subscribers. The data exchange serving for this switch identifier manipulation between each of the local control units on the one hand the appertaining central processor on the other hand occurs via data connections which are established and continuously maintained in the service-ready state, between each of the local control units via the switching matrix in service and the respective service-ready processor. These data connections are established like message connections via the central switching matrix. They run in the already noted manner via the units MB1 and G1 insofar as the switching matrix K1 and the central processor are in service at the time.

The noted data connections between each of the local control units of each of the line trunk groups on the one hand, and the respective in-service central processor on the other serve not only for the executed data exchange for the development of the noted switch identifier manipulation, but these data connections also serve, so that during start-up of a central processor and its allocated central switching matrix, this central processor transmits program and switching software to all local control units of all line trunk groups. This is also known as "Loading" and is described in detail in the already noted Journal "telecom report", Supplement 1981, particularly Page 19ff. Provided for this purpose, in the case of the presently described embodiment, is an input-output unit, for example G1 connected with the central processor, ZW1 for example, to which a number of data buffer memory units, for example MB1 are connected; a number of data connections lead from each of these to the local control units of the line trunk groups noted via the appertaining switching matrix, for example K1. As with the link lines, these data buffer memories are individually directly connected to terminations of the switching matrix. As has been brought out, a link line and accordingly also a link circuit is respectively realized through a channel pair. The channel pairs belong to the time division multiplex lines connected to the switching matrix K1 and/or K2.

The switching system data required and to be stored in the local control unit, as for example, subscriber line status, subscriber call number allocation, subscriber listings and technical characteristics of connected trunk lines and the like, as well as program data which determines the development of the switching system functions, are now entered into corresponding memories of the two central processors and from there are transmitted to and stored in the local control units of the various line trunk groups upon the start-up of a central processor. This transmission and storage occurs individually for each line trunk group, i.e. individually and sequentially for the local control units of the various line trunk groups. The time consumed for this purpose, upon activation of a switching center, is vanishingly small in comparison to that required for the total activities of a switching center. However, this consumed time takes on a greater significance in the case of a stand-by service switch-over of the central processor and the central switching matrix. For this case, provision is also made to load the local control units of the line trunk groups with the switching system data and program data, in order to reliably insure fully synchronous operation between these data, which are thus stored in the central processor newly going into service on the one hand and the local control units on the other hand. By this means, all deviations are excluded that might otherwise arise relative to these switching system data and these program data, that are thus stored in the central processor going into service on the one hand and in the local control units of each of the various line trunk groups on the other. Such deviations may, for example, result, if modifications are made over a time interval in these switching system data and/or program data, or as a result of these data in the local control units having been subject to error due to certain disturbing effects. Such departures are however safely excluded through a renewed loading of all local control units with the program and the switching system data in connection with the provided stand-by switch-over of the central processor newly going into service.

Now, in order to minimize the time required for the described loading of the program data and the switching system data into the local controllers of the various line trunk groups from the central processor newly going into service in connection with the stand-by switch-over, provision is made so that two line trunk groups are respectively allocated to each other, that in each of the same, line units serving for the external connection of subscriber and/or trunk lines and connected within the respective line trunk group with their sub-switching matrix in normal service, are in part interchangeable during emergency service. Use is thus made of the technical procedure already described in detail further above, whereby the switch-over from normal service to emergency service in all line trunk groups is implemented. Thus, by this means, the line units of a respective first of two line trunk groups allocated together in pairs are additionally switched to a respective second line trunk group, which also occurs in the same manner in all line trunk groups allocated together in pairs. Thereby the corresponding switch identifier processing as well as the setting of the sub-switching matrix for the connections running via the switched-over line units is carried out by the local control unit of the respective other, thus second, line trunk group.

Thus, in this operating mode, only one of all the line units, which may for example be subscriber line units, multiple subscriber line units, trunk line termination circuits, which may also be trunk line multiple line termination units and the like, is served by the local control unit within two line trunk groups allocated to each other in pairs. In this operating mode also, all connections that are established over the line units of both line trunk circuits are interconnected via the sub-switching matrix of only one of the two line trunk groups. Thus it follows from this, that since in this operating mode, the line units respectively of a first of these two line trunk groups are additionally switched to the sub-switching matrix of the respective other line trunk group, the entire establishment of the connection occurs via the sub-switching matrix of the second line trunk group with the aid of its local control unit. Thereby the two line trunk groups are fully and equally enabled, i.e. this switch-over relative to these two line trunk groups may follow in the reverse direction. The entire further development of the operation then follows in the same way as has been described in detail further above, for emergency service. In this operating mode, all line trunk groups are in emergency service concurrently.

Upon the establishment of the emergency service state, half of all the local control units are removed from service as well as half of the sub-switching matrices, and respectively one local control unit and respectively that sub-switching matrix allocated to it per pair of trunk line groups.

The stand-by service switch-over of one of the two central processors by the respective other central processor is thus prepared during the on-going operation of the central processor that has been in service up to that time, by the transfer of all line trunk groups allocated to each other in pairs from normal service to emergency service. Furthermore, the other central processor establishes data connections to the local control groups of all first line trunk groups via the other central switching matrix allocated to it. This takes place in the manner already described further above. These connections are thus established to the local control units of all those line trunk groups, the line units of which have been switched over to the sub-switching matrix of the other line units allocated to each other in pairs, thus those line trunk groups whose local control units and whose sub-switching matrices have been withdrawn from normal switching service in connection with the stand-by service switch-over being prepared.

Via the previously described newly established data connection, the central processor newly going into service in connection with the preceding stand-by service switch-over now loads the total program data and the total switching system data into the appertaining local control unit and the corresponding memory of the same. This central processor thus transmits to the respective local control units, which have been withdrawn from regular switching service for the time being, in continuous sequence, the program and switching software required for their renewed start-up, and storage in the same. This occurs on the part of the already prepared central processor, going into service in connection with the preceding stand-by service switch-over during a transition period in which the other central processor is still engaged in switching service with those local control units and sub-switching matrices which have been transferred from normal service to emergency service for the preparation of the intended alternate circuit, for this purpose.

When the presently described procedures for the loading of program data and switching system data for the preparation of stand-by service switch-over have been completed, the stand-by switch-over occurs.

Thereby the entire central data preparation and control functions are transferred from the one central processor to the other central processor, in a manner known in the art, whereby the one central switching matrix is also replaced by the other central switching matrix. Provision may thereby be made so that already existing connections can remain intact until their release. All new connections are then established with the aid of the newly loaded local control unit, and via the respective sub-switching matrices allocated to them. The other local control units and their allocated sub-switching matrices are no longer employed for the establishment of additional connections. A switch-over then follows within the line trunk groups with the aid of the change-over contacts 1d1 through 1d4 shown in FIG. 2. Thus at the same time, the switching service thus continues with the aid of those local control units that had been removed from the normal switching service prior to the completed stand-by service switch-over, and via the allocated sub-switching matrices. Those local control units and allocated sub-switching, which have carried out the switching service in quasi-emergency operation up to the time of the stand-by switch-over now go out of service. Thereafter however, the central processor that has gone into service in connection with the stand-by service switch-over also sequentially establishes data connections to all those local control units, which have now gone out of service in connection with the stand-by service switch-over that has ensued. In addition, the central processor also loads the necessary program data and switching data into the memory of these local control units. This occurs over a period of time spread throughout the normal switching procedure. After the central processor has loaded all the local control units with the necessary program data and the appertaining switching system data, the operating mode of the line trunk groups allocated to each other in pairs, is successively returned again in sequence from emergency service to normal service.

Now that the description of the embodiment of the invention, shown in abstract in the Figures, of a time division multiplex switching system in which the invention is applied, has been treated in general terms, it turns to particular aspects significant to the invention.

As already detailed, provision is made for the preparation of a stand-by service switch-over procedure, so that single data connections are interconnected to all first line trunk groups from the central processor, for example ZW2, which assumes the central processor functions instead of the other central processor, for example ZW1, via the central switching matrix, for example K2, allocated to the central processor, for example ZW2 assuming those functions, thus placed into service ready state; as already detailed, the line trunk groups are allocated to each other in pairs, and in the design and functional embodiment described here, within each of the line trunk groups allocated to each other there are line circuits, for example 1DIU1, (1DIU2) and others serving for the external connection of subscriber and/or trunk lines and which within their respective line trunk groups are primarily, i.e. during total disturbance-free service, connected with their sub-switching matrix, for example GS1, which are switchable with the aid of change-over switches, for example 1d2, through which the line units respectively of this first line trunk group, for example LTG1 is additionally switched to the sub-switching matrix, for example LTG2 of the respective other, thus the respective second line trunk group, for example LTG2, whereupon the corresponding switch identifier processing as well as sub-switching matrix setting to be interconnected via the switched-over line units are also executed by the local control unit, for example GP2, of the other, thus second line trunk group, for example LTG2.

In order to arrive at a better overview of the details of the functional embodiment described it is to be established in summary, that in undisturbed normal service the central processor ("the one processor") ZW1 is active, and that all connections are established via its allocated switching matrix ("the one central switching matrix"), and that for the preparation of a stand-by service switch-over this central processor and this central switching matrix within each of the pairs of the line trunk groups, the control functions and the interconnected switching functions are assumed by the local control unit GP2 and the sub-switching matrix of the second line trunk group LTG2, thus also for the line units that belong to the first line trunk group LTG1; furthermore that central processor which will assume the central processor functions during the stand-by service switching procedure, thus the central processor ZW2, will establish data connections in the manner described further above via the central switching matrix K2, and in fact to the local control units of all those line trunk groups which are represented at the "first line trunk groups" in the functional example being described here, thus to the local control unit GP1 of the line trunk group LTG1. The new data connection switched through for this line trunk group is thus also brought into the service ready state via its sub-switching matrix, for example GS1.

Data connections for the preparation of a stand-by service switching procedure are thus brought into service-ready state from the central processor ZW2, via its allocated central switching matrix K2 to the local control units (GP1 and others) of all first trunk line groups (LTG1 and others). In the context according to the invention, further provision is made, so that connection data, indicating via a respective central switching matrix, for example K1, still in on-going service during a stand-by service switching procedure, and via existing individual connections of the sub-switching matrices, for example GS2, of the respective second line trunk circuits, for example LTG2, which external switching matrix circuit is connected with which of its duplicates, are transmitted from the control unit GP2 of the second trunk line group LTG2 to the control unit GP1 of the first line trunk group LTG1. These connection data thus indicate which subscriber line, trunk line or other individual trunk circuit is linked with which subscriber line, trunk line or other individual trunk circuit via sub-switching matrices and central switching matrices. Such connections may run within a respective pair of line trunk groups but also between line trunk groups of different such pairs. Significant in this context is not the course of the interconnection path within the sub-switching matrices and within the respective central switching matrix, but only the connection data related to which external sub-switching matrix is respectively connected to which of its duplicates within the overall telephone switching system. These connection data can also indicate, per existing connection, which two external sub-switching matrix circuits are connected with which two central switching matrix circuits and which central switching matrix circuit is connected with its duplicate. Thus in this case the location of the transition from the respective sub-switching matrix to the central switching matrix, and oppositely, is also determined in relation to the respective course of the interconnection within the sub-switching matrices and the central switching matrix.

The previously noted connection data are storable in the local control units for the purpose described here, and specifically in the local memories GR1 and GR2 which are individually allocated to the local control units GP1 and GP2. Provision may be made so that the connecting paths which are at all times interconnected respectively via the associated line trunk group, i.e. during fault-free normal service, are stored in these memories of the local control units of the line trunk groups. In this case therefore, the memory allocated to the one line trunk group respectively stores which connections run via the respective other line trunk group.

On the other hand, the possibility also exists of undertaking such storage only when a stand-by switchover procedure is being prepared. In any case however, storage appertaining to the connection paths interconnected via the respective associated line trunk group is provided in the manner described.

Further provision is now made in accordance with the invention, so that the local control unit, e.g. GP1, of that line trunk group, e.g. LTG1 to which the central processor assuming the central processor function, e.g. ZW2 has already established the data connections during the stand-by switch-over preparation process sends a request signal to the local control unit, e.g. GP2 of the respective associated line trunk group, e.g. LTG2. On the basis of such a request signal, the latter local control unit, e.g. GP2 transmits all connection data stored in its memory, e.g. GR2, to the local control unit GP1 from which the request signal was sent. Transmission paths GL1/2 which are individually allocated to each of the line trunk groups serve for the transmission of the request signal and for the connection data in the opposing direction.

The connection data transmitted in the manner previously described are now stored through the local control unit e.g. GP1 which previously sent the request signal. This storage may take place in its respective memory, e.g. GR1 or in still another memory of a similar type.

Once the connection data for the preparation of a stand-by switch-over procedure has been transmitted within each pair of line trunk groups in the previously described manner they are next retrieved from these by the central processor which assumes the central processor functions during the stand-by service switch-over procedure.

On the basis of the connection data, which the central processor e.g. ZW2, assuming the central processor functions retrieves, in the previously described manner, during the respective stand-by service switch-over event, this central processor establishes connections via its switching matrix, e.g. K2, as well as via the sub-switching matrix, e.g. GS1 of that trunk line circuit, e.g. LTG1, from whose local control unit, e.g. PG1, the request signal was sent, and which has received the connection data from its respective associated line trunk group via the transmission path GL1/2. Connections are thus established in this manner, for the preparation of the stand-by switch-over in the central switching matrix, e.g. K2, of that central processor, e.g. ZW2, which assumes the central processor functions during the stand-by service switch-over procedure, which finally serves for the assumption of the individual connections existing during the instantaneous service situation. Connections within the respective sub-switching matrix, e.g. GS1, which serve the same purpose, are also interconnected in a corresponding manner. Thus all connections present during the instantaneous service situation and in use on the part on the connected subscriber are simulated. This applies to all pairs of line trunk groups. The stand-by switch-over itself then follows through a change-over procedure in such a way that change-over switches 1d2 and 2d2 are all actuated, whereby the change-over switch 1d2 returns to its rest position shown, whereas the change-over 2d2 is switched to its operating position (opposite to that shown). Through this change-over procedure which occurs simultaneously or nearly simultaneously in all line trunk groups, the overall telephone service continues flawlessly i.e. without service interruption as well as without interruption of existing individual connections.

In order for the change-over procedures to occur simultaneously, provision may be made for a prepared change-over signal to be sent to all line trunk groups together with real-time data; when the point in time established by the time data then arrives, the change-over described, serving for the stand-by switch-over, will occur simultaneously in all line trunk groups.

A transmission path GL1/2 provided for each of the line trunk group pairs serves for the transmission of the respective request signal as well as for the connection data. This is connected with transmitting and receiving units (GA1) and (GA2) of each of the appertaining line trunk groups LTG1 and LTG2. These transmitting and receiving units are individually allocated to the local control units. Among other functions, these transmitting and receiving units serve for the sending of the request signals on the part of one local control unit and for the reception of the same by the respective other local control unit. These transmitting and receiving units likewise serve for the sending and reception of the stored connection data in the manner described. The possibility also exists of directing the noted transmission path GL1/2, provided per line trunk group, over the appertaining sub-switching matrices. In this case, a direct connection between internal interfaces of the switching matrices GS1 and GS2 is provided.

The possibility is also to be noted, of suppressing the preparation phase of a stand-by service switch-over. In this connection provision may thus be made so that no new connections are established during the preparation phase of a stand-by service switch-over. Provision is thereafter made so that, during the transmission of the connection data from the local control units of the second line trunk groups to those of the first line trunk groups and during the resulting establishment of connections in conjunction with these data, the establishment of connections dialed by calling subscribers is prevented. In this connection, provision may be made so that the establishment of connections or uncompleted connections from subscriber stations in a calling mode, to connection discrete switching units, e.g. dialing record reception, may also be prevented. Thereby the possibility is provided, after a transmission of stored connection data in the manner described, or preparing a complete substitution of the interconnections in use by the appertaining subscribers which come into play during the execution of the stand-by service switch-over procedure and makes it possible for all connections existing, and already in use by the appertaining subscribers, to be maintained.

What we claim is:

1. A circuit arrangement for centrally controlled telecommunication systems, including PCM time-division multiplex telephone switching systems, including a central switching matrix serving for the switching-through of connections and a central processor serving, at least, for the control thereof and for the necessary switch identifier processing and being duplicated for stand-by service, wherein a number of local line groups, each including a sub-switching matrix for the external connection of trunk and/or subscriber lines and each including a local control unit for the reception of switch identifiers from said lines, for switch identifier pre-processing and forwarding to the central processor and for the transmission of switch identifiers on said lines, wherein in each of said line groups a respective sub-switching matrix is internally connected separately by group via two groups link lines, with switching matrix terminations to the one and the other of two parallel central switching matricies provided, wherein data connections for each respective local control unit are brought into service-ready condition and/or maintained therein, for data exchange between local control units on the one hand and the respective service-ready processor on the other, for processing said switch identifiers, wherein said line groups are in each case allocated to each other in pairs, wherein within each of the same line units, serving for the external connection of subscriber and/or trunk lines and primarily connected to their sub-switching matrix, are connected to change-over switches, wherein said line units of a respective first of said two line groups is switchable over by means of said change-over switch to the respective second line group and can be switched over to the sub-switching matrix of the second line group and vice versa, and wherein switch identifier processing for connections to be switched through the switched-over line units are well as the sub-switching matrix setting are also executed by the local control unit of the other line group; characterized  in that a switch-over within each of said pairs of line groups allocated to each other effects a switch-over from one of the two central processors, together with its allocated central switching matrix, to the other of the two processors, with its allocated central switching matrix;

in that in preparation for said switch-over, and while a first of the two processors continues in service for the time being,  firstly, connection data are stored in the local control units of the respective second line groups, which data indicate, relative to the existing, individual connections, via the central switching matrix still in service and via the sub-switching matrices of the respective second line groups, which external sub-switching matrix is connected with which of its counterparts, or which two external sub-switching matrices are connected with which two central switching matrix terminations and which central matrix termination is connected with which of its counterparts;

secondly, data connections are brought into service-ready state by the other central processor via its allocated central switching matrix to the local control units of all first line groups;

thirdly, in each respective line group pair, said connection data are called for by means of a request signal sent by the local control unit of the respective first line group to the control unit of the respective second line group, are transmitted via local transmission paths individual to each line group pair respectively, from the last-named control unit to the first-named control unit, and stored therein, and subsequently retrieved therefrom by the other central processor, and fourthly, the last-named central processor establishes connections via its central switching matrix and the sub-switching matrices of the respective first line groups on the basis of the connection data that it has retrieved; and in that, thereafter, the switch-over to the alternate circuit is effected by the switch-over of all the line units of the first line groups from the sub-switching matrices of all the first line groups to the sub-switching matrices of all the second line groups through their respective local control units.

2. A circuit arrangement according to claim 10, wherein, after the establishment of the data connections through the other central processor to the local control units, the former transmits to the latter, for storage therein, the necessary program and switching software for their service start-up.

3. A circuit arrangement according to claim 10, wherein during that transmission of the connection data from the local control units of the second line trunk groups to those of the first line trunk groups and during the establishment of the connections resulting in conjunction with these data, an establishment of connections by interconnected subscribers is prevented, in particular that an establishment of connections from subscriber stations in the calling state or uncompleted connections to individual connected switching units, e.g. dialing record reception, is prevented.

4. A circuit arrangement for centrally controlled telecommunication switching systems, including PCM-telephone switching systems wherein a central switching matrix serving for interconnection together with a program controlled central processor serving, at least, for its control and the required switch identifier processing for alternate circuit switching (stand-by service) is provided in duplicate, and wherein a number of local trunk line group, each group with a sub-switching matrix for the connection of external trunk and/or subscriber lines and equipped with a local programmable control unit for the reception of switch identifiers from said lines, for switch identifier pre-processing as well as for forwarding switch identifiers to the central processor and the transmission of switch identifiers over these lines is provided and wherein in each of said line trunk groups, the respective sub-switching matrix is, separately by group, internally connected via groups of link lines with switching matrix interfaces to the one and the other of the parallel central switching matrices and wherein data connections respectively, per local control unit are brought into service condition and/or thereby maintained therein, for data exchange between the local control units on the one hand and the respective service-ready and/or service prepared processor on the other serving the foregoing switch identifier processing and wherein the line trunk groups are allocated to each other in pairs, and wherein line units including ones from the group comprising subscriber line circuits, multiple subscriber line circuits, trunk line termination circuits, multiple trunk line termination circuits, primarily connected to their sub-switching matrix and within the respective line trunk group serving for the external connection of subscriber and/or trunk lines, are switchable in a manner in which the line units of respectively a first of these two line trunk groups are additionally switched to the sub-switching matrix of the respective other, of a respective second line trunk group, whereupon the corresponding switch identifier processing as well as the sub-switching matrix setting for the connections to be interconnected via the switched-over line units is likewise executed by the local control unit of the other second line trunk group wherein the improvement comprises that through the switch-over within each of said pairs of line trunk groups allocated to each other for implementing the stand-by service, one of the two central processors along with its allocated central switching matrix is prepared by the other of the two central processors, likewise with its central switching matrix and during continuing service of the first, by way:

first, of data connections which are brought into service-ready state by the other central processor via its allocated central switching matrix to the local control units of all first line trunk groups;

second, of connection data which indicate, via the central switching matrix still in service and via the sub-switching matrix of the respective individual connections within the second line trunk circuit which external sub-switching matrix is connected with which of its like or which two external sub-switching matricies are connected with their line and which are stored in the local control units of the respective second line trunk groups and which on the basis of a request signal from the local control unit of the respective first line trunk group to the respective second line trunk group, are transmitted per line trunk group pair, via local transmission paths of the line trunk pairs respectively from the last named control unit to the first named control unit and stored therein, and which in addition are retrieved therefrom through the other central processor;

third, of connections, which said last-named central processor establishes in conjunction with the retrieved connection data via its central switching matrix and the sub-switching matrices of the respective first line trunk groups; and that the switch-over of all line trunk groups from the sub-switching matrices of all first line trunk groups to those of all second line trunk groups occurs independently of the execution of the latter procedure for the establishment of connections.

5. A circuit arrangement according to claim 4, wherein, after the establishment of the data connections through the other central processor to the local control units, the former transmits to the latter, for storage therein, the necessary program and switching software for their service start-up.

6. A circuit arrangement according to claim 4, wherein during said transmission of the connection data from the local control units of the second line trunk groups to those of the first line trunk groups and during the establishment of the connections resulting in conjunction with said data, an establishment of connections by interconnected subscribers is prevented, including that an establishment of connections from subscriber stations in the calling state or uncompleted connections to individual connected switching units is prevented.

7. A circuit arrangement for centrally controlled telecommunication switching systems, particularly PCM-telephone switching systems wherein a central switching matrix serving for interconnection together with a program controlled central processor serving, at least, for its control and the required switch identifier processing for alternate circuit switching (stand-by service) is provided in duplicate, and wherein a number of local trunk line group, each with a sub-switching matrix for the connection of external trunk and/or subscriber lines and equipped with a local programmable control unit for the reception of switch identifiers from said lines, for switch identifier pre-processing as well as for forwarding switch identifiers to the central processor and the transmission of switch identifiers over said lines is provided and wherein in each of said line trunk groups, the respective sub-switching matrix is separately internally connected by groups via groups of link lines with switching matrix interfaces to the one and the other of two parallel central switching matrices and wherein data connections respectively, per local control unit are brought into service condition and/or maintained therein thereby, for data exchange between the local control units on the one hand and the respective service-ready and/or service prepared processor on the other serving the foregoing switch identifer processing and wherein the line trunk groups are allocated to each other in pairs, and wherein line units primarily connected to their sub-switching matrix and wherein the respective line trunk group serving for the external connection of subscriber and/or trunk lines, are switchable in a manner wherein the line units of respectively a first of these two line trunk groups are additionally switched to the sub-switching matrix of the respective other of a respective second line trunk group, whereupon the corresponding switch identifier processing as well as the sub-switching matrix setting for the connections to be interconnected via the switched-over line units is likewise executed by the local control unit of the other line trunk group, wherein the improvement comprises that through the switch-over within each of said pairs of line trunk groups allocated to each other for implementing the stand-by service, one of the two central processors along with its allocated central switching matrix is prepared by the other of the central processors, likewise with its central switching matrix and during continuing service of the first, by way:

first, of data connection which are brought into service-ready state by the other central processor via its allocated central switching matrix to the local control units of all first line trunk groups;

second, of connection data which indicate, via the central switching matrix still in service and via the sub-switching matrix of the respective individual connections within the second line trunk circuit which external sub-switching matrix is connected with which or its like or which two external sub-switching matrices are connected with their like and which are stored in the local control units of the respective second line trunk groups and which on the basis of a request signal from the local control unit of the respective first line trunk group to the respective second line trunk group, are transmitted per line trunk group pair, via local transmission paths of the line trunk pairs respectively from the last named control unit to the first named control unit and stored therein, and which are retrieved therefrom through the other central processor;

third, of connections, which said last-named central processor establishes in conjunction with the retrieved connection data via its central switching matrix and the sub-switching matrices off the respective first line trunk groups; and that the switch-over of all line trunk groups from the sub-switching matrices of all first line trunk groups to those of all second line trunk groups occurs independently of the execution of the latter procedure for the establishment of connections.

8. A circuit arrangement according to claim 7, wherein, after the establishment of the data connections through the other central processor to the local control units, the former transmits to the latter, for storage therein, the necessary program and switching software for their service start-up.

9. A circuit arrangement according to claim 7, wherein during said transmission of the connection data from the local control units of the second line trunk groups to those of the first line trunk groups and during the establishment of the connections resulting in conjunction with said data, an establishment of connections by interconnected subscribers is prevented, including that an establishment of connections from subscriber stations in the calling state or uncompleted connections to individual connected switching units is prevented.

* * * * *